US008344738B2

(12) United States Patent
Kouno

(10) Patent No.: US 8,344,738 B2
(45) Date of Patent: Jan. 1, 2013

(54) POSITION DETECTOR

(75) Inventor: Haruhiko Kouno, Fukuoka (JP)

(73) Assignee: Panasonic Corporation, Osaka (JP)

( * ) Notice: Subject to any disclaimer, the term of this patent is extended or adjusted under 35 U.S.C. 154(b) by 248 days.

(21) Appl. No.: 12/765,029

(22) Filed: Apr. 22, 2010

(65) Prior Publication Data
US 2010/0271048 A1   Oct. 28, 2010

(30) Foreign Application Priority Data

Apr. 24, 2009 (JP) ................................ 2009-105990

(51) Int. Cl.
*G01R 27/26* (2006.01)
(52) U.S. Cl. ........ 324/658; 324/661; 324/663; 324/662; 345/174; 345/173; 178/18.06; 178/19.03
(58) Field of Classification Search .................. 324/658, 324/661, 663, 662; 345/174, 173; 178/18.06, 178/19.03
See application file for complete search history.

(56) References Cited

U.S. PATENT DOCUMENTS

| | | | | |
|---|---|---|---|---|
| 4,686,332 A * | 8/1987 | Greanias et al. | ............. | 345/173 |
| 4,931,782 A * | 6/1990 | Jackson | ......................... | 345/174 |
| 5,220,136 A * | 6/1993 | Kent | ............................. | 345/173 |
| 5,451,724 A * | 9/1995 | Nakazawa et al. | ......... | 178/18.05 |
| 5,914,465 A * | 6/1999 | Allen et al. | ................ | 178/18.06 |
| 6,088,069 A * | 7/2000 | Farlow | ............................ | 349/12 |
| 6,246,395 B1 * | 6/2001 | Goyins et al. | ................ | 345/173 |
| 6,965,375 B1 * | 11/2005 | Gettemy et al. | ............. | 345/173 |
| 7,348,964 B1 * | 3/2008 | Gettemy et al. | ............. | 345/173 |
| 7,483,016 B1 * | 1/2009 | Gettemy et al. | ............. | 345/173 |
| 8,228,314 B2 * | 7/2012 | Kong et al. | .................... | 345/174 |
| 2001/0006369 A1 * | 7/2001 | Ely | ................................. | 341/20 |
| 2002/0050984 A1 * | 5/2002 | Roberts | ......................... | 345/173 |
| 2004/0155871 A1 * | 8/2004 | Perski et al. | .................. | 345/174 |
| 2005/0052429 A1 * | 3/2005 | Philipp | ......................... | 345/173 |
| 2007/0095909 A1 * | 5/2007 | Chaum | ......................... | 235/386 |
| 2008/0048997 A1 * | 2/2008 | Gillespie et al. | .............. | 345/174 |
| 2008/0055274 A1 * | 3/2008 | Van Berkel et al. | .......... | 345/174 |
| 2009/0095540 A1 * | 4/2009 | Zachut et al. | ............. | 178/18.03 |
| 2009/0167711 A1 * | 7/2009 | Jiang et al. | .................... | 345/173 |
| 2010/0073319 A1 * | 3/2010 | Lyon et al. | .................... | 345/174 |
| 2010/0090975 A1 * | 4/2010 | Nagata et al. | ................. | 345/174 |
| 2010/0117961 A1 * | 5/2010 | Westerman | .................... | 345/163 |
| 2010/0224424 A1 * | 9/2010 | Kasajima | ................... | 178/18.06 |
| 2010/0302205 A1 * | 12/2010 | Noma | ............................ | 345/174 |
| 2010/0321334 A1 * | 12/2010 | Oda et al. | ...................... | 345/174 |
| 2010/0328240 A1 * | 12/2010 | Matsubara | ..................... | 345/173 |
| 2011/0007035 A1 * | 1/2011 | Shai | .............................. | 345/179 |
| 2011/0069022 A1 * | 3/2011 | Yokota et al. | ................. | 345/173 |
| 2011/0100728 A1 * | 5/2011 | Chen | .......................... | 178/18.06 |

(Continued)

*Primary Examiner* — Patrick Assouad
*Assistant Examiner* — Lamarr Brown
(74) *Attorney, Agent, or Firm* — Greenblum & Bernstein, P.L.C.

(57) ABSTRACT

A multilayer made up of a support member with first electrodes including a plurality of electrodes arranged in parallel to each other and the second electrodes including a plurality of electrodes that are arranged parallel to each other so as to cross the first electrodes. The multilayer also includes a protective layer (a front member) that is provided opposite one side of the support member and with which a predetermined position pointing member is brought into contact, and a reinforcing material (a rear member) provided opposite the other side of the support member. A gas layer (space) is provided between the first electrodes or the second electrodes and at least one of the support member, the protective layer (the front member), and the reinforcing material (the rear member), thereby blocking electrical coupling paths that increase electrostatic capacitance.

8 Claims, 15 Drawing Sheets

U.S. PATENT DOCUMENTS

| | | | |
|---|---|---|---|
| 2011/0242005 A1* | 10/2011 | Ung et al. | 345/173 |
| 2011/0279398 A1* | 11/2011 | Philipp | 345/174 |
| 2011/0298738 A1* | 12/2011 | Takahashi et al. | 345/173 |
| 2012/0074962 A1* | 3/2012 | Fukushima et al. | 324/661 |
| 2012/0146944 A1* | 6/2012 | Lee et al. | 345/174 |
| 2012/0162131 A1* | 6/2012 | Perski et al. | 345/174 |
| 2012/0218215 A1* | 8/2012 | Kleinert et al. | 345/173 |

* cited by examiner

FIG. 4
(a)
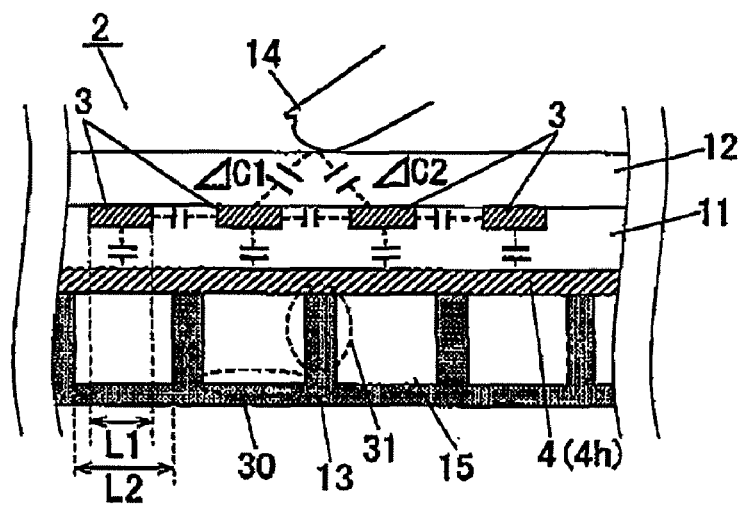
(b)
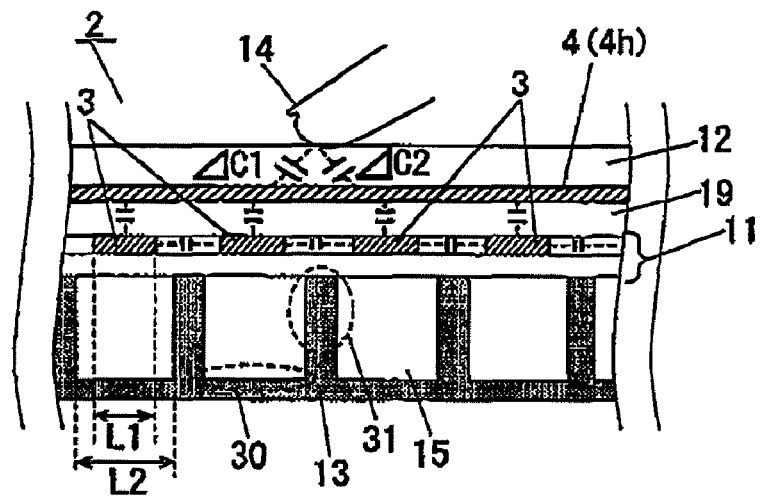
(c)
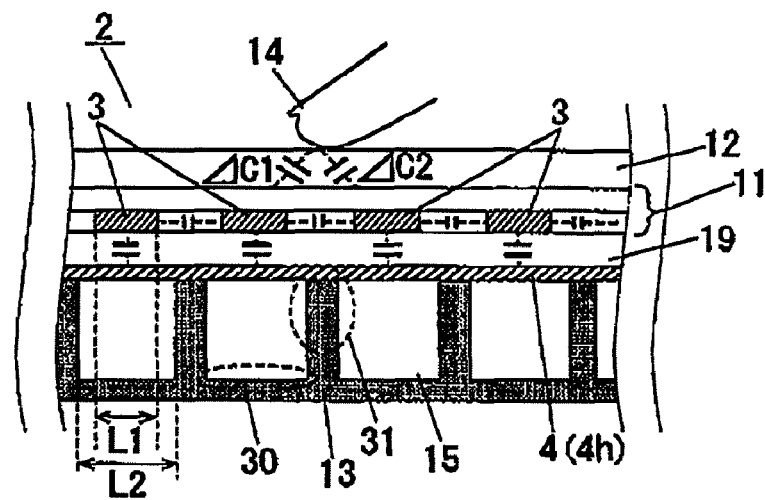

FIG. 6
(a)
NO CONTACT OF POSITION POINTING MEMBER
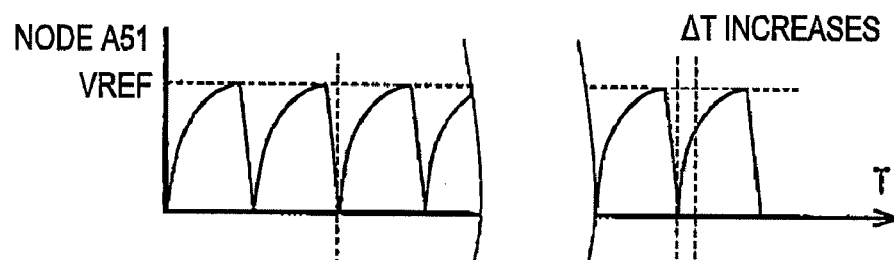
(b)
CONTACT OF POSITION POINTING MEMBER
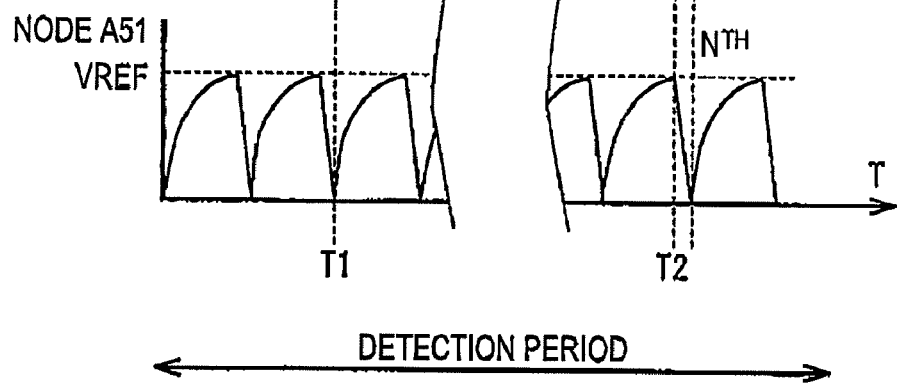

FIG. 8
(a)
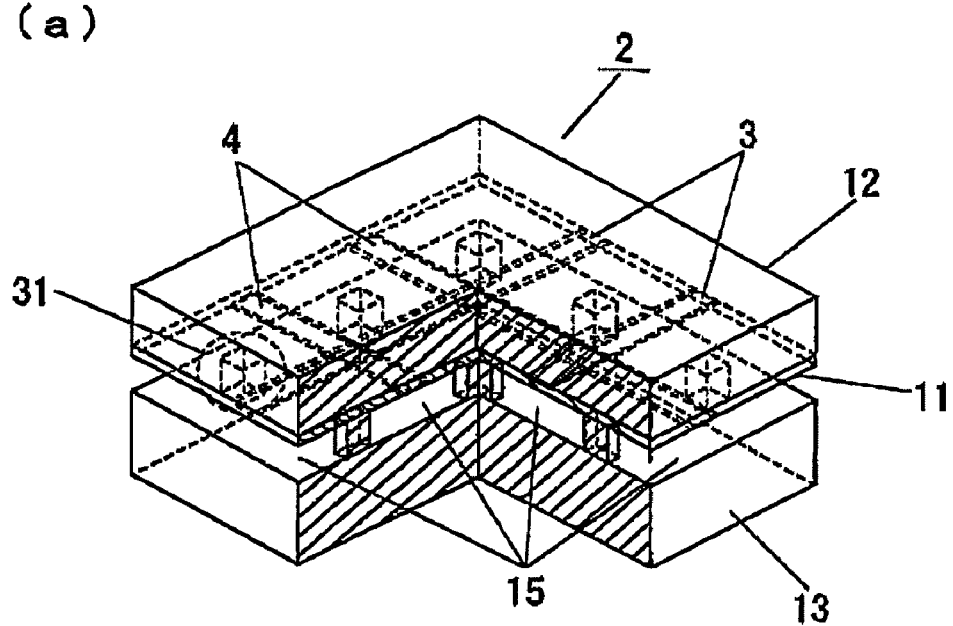
(b)
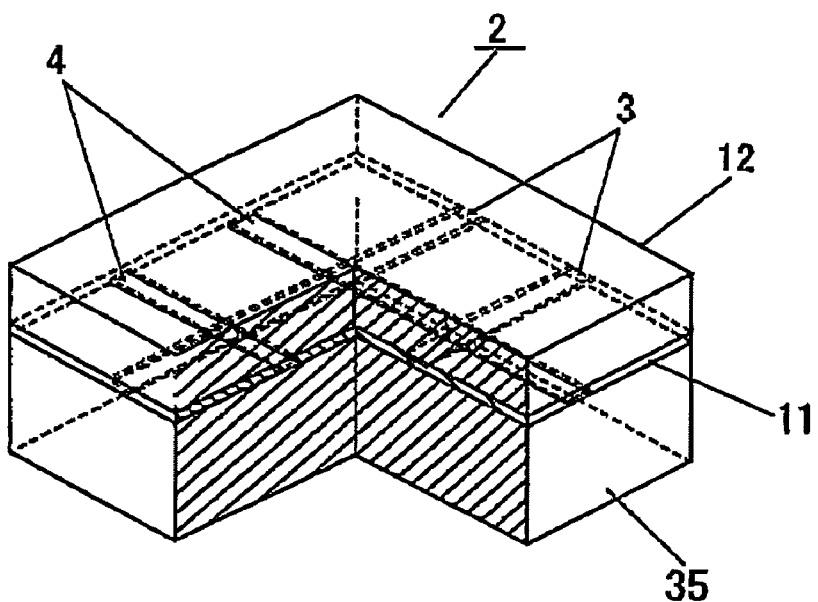

FIG. 13
(a)
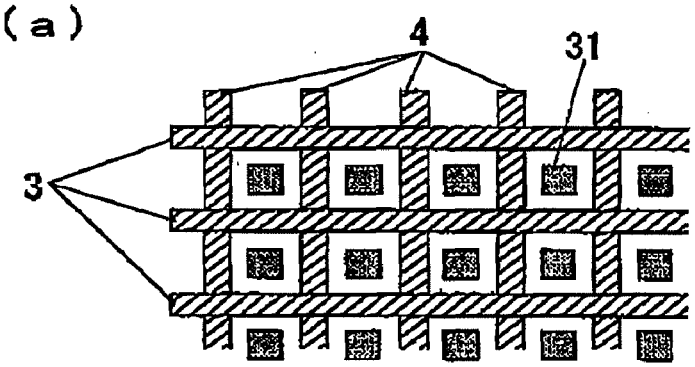
(b)
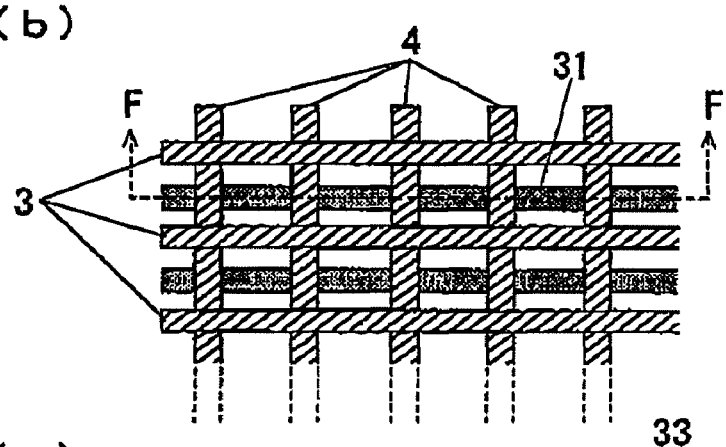
(c)
(d)
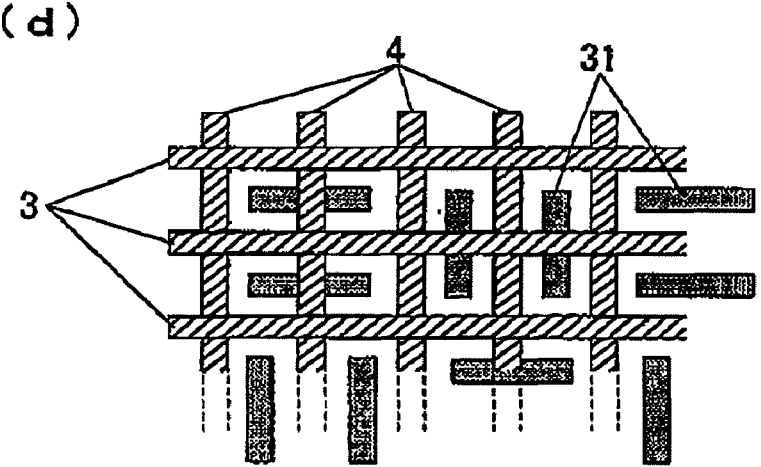

102 ELECTRONIC WHITE BOARD
103 DETECTION SURFACE (WRITE SURFACE)
104 OPTICAL CARRIAGE
105 PRINT SECTION
106 RECORDING SHEET
107 CHASSIS

POSITION DETECTOR

BACKGROUND

1. Field of the Invention

The present invention relates to a position detector used in various information terminals, and the like, requiring a touch input performed with a finger and a stylus pen.

2. Description of the Related Art

In order to enhance a man-machine interface, information terminals that enable performance of a touch input, such as a touch panel and a tablet, have already been on the market. Position detectors are used as means for embodying a touch input. A position detector generally detects a position on a surface of a panel, or the like, touched with a finger or a stylus pen (hereinafter often called a "position pointing member"). The thus-detected contact position is converted into predetermined positional information, and the information terminal is configured so as to carry out various processing in accordance with the positional information.

A configuration for detecting a position contacted with a position pointing member described in connection with; for instance, (Patent Document 1) is a position detector that detects a change in electrostatic capacitance occurring when the position pointing member is pressed against a surface of a panel, or the like.

A position detector described in connection with (Patent Document 1) has a multilayered structure. Specifically, a plurality of electrodes (a first electrode group) are formed on one side of a sheet having a predetermined dielectric constant so as to run parallel to each other. Another plurality of electrodes (a second electrode group) are formed on the other side of the sheet so as to cross the first electrode group and run parallel to each other (the electrode groups or a single electrode is sometimes collectively referred to as "detection electrodes"). Both sides of the sheet having the thus-formed detection electrodes are sandwiched between sheet-like substrates, to thus make the multilayered structure. The structure makes it possible to detect a position contacted with a position pointing member with high accuracy.

Patent Document 1: U.S. Pat. No. 4,686,332

For instance, in a position detector utilizing a change in electrostatic capacitance described in connection with (Patent Document 1), a change in electrostatic capacitance occurring as a result of a position pointing member contacting a panel surface is taken as $\Delta C$. Further, electrostatic capacitance determined by combined capacitance of adjacent electrodes, among electrodes running parallel to each other, achieved without regard to presence or absence of the contact of the position pointing member is taken as C. In order to stably detect a change in electrostatic capacitance resultant from a contact of the position pointing member with high accuracy, it is desirable to minimize the electrostatic capacitance C and increase $\Delta C$ that is an amount of relative change in electrostatic capacitance.

However, when a related-art position detector utilizing change in electrostatic capacitance is applied to a large-size display panel measuring 100 inches, or thereabouts, a length over which detection electrodes run along with each other in a detection panel making up the position detector exceeds 1000 mm. Interline capacitance arising between adjacent detection electrodes eventually increases, and the number of crosses (the area of crosses) between the first electrode group and the second electrode group also eventually increases.

More specifically, when a large-size detection panel measuring 100 inches is built, electrostatic capacitance of one detection electrode closely reaches 100 pF. On the contrary, changes in electrostatic capacitance induced by a contact of the position pointing member; namely, $\Delta C1$ and $\Delta C2$, usually come to only 1 pF or less.

In short, the electrostatic capacitance C achieved even when the position pointing member is not held in contact with the panel is large, whilst $\Delta C$ arising when the position pointing member is brought into contact with the panel becomes relatively smaller. Thus, the large-size panel encounters a problem of being susceptible to influence of external noise and difficult to stably detect a position with high accuracy.

SUMMARY

The present invention aims at providing a position detector capable of stably, accurately detection a position even when position detection technique based on a change in electrostatic capacitance is applied to a large-size panel, or the like.

In order to solve the problem, a position detector of the present invention includes in a laminated manner, a support member on which first electrodes including a plurality of electrodes arranged in parallel to each other and second electrodes including a plurality of electrodes arranged in parallel to each other so as to cross the first electrodes are formed; a front member that is opposed to one side of the support member and brought into contact with a predetermined position pointing member; and a rear member that is opposed to another side of the support member, wherein a space is provided at positions between the first electrodes or the second electrodes and at least one of the support member, the front member, and the rear member.

The configuration makes it possible to increase amounts of relative changes in electrostatic capacitance, and enhanced accuracy of position detection can be achieved even in a large-size position detector.

The present invention also lines in that protrusions are provided on a surface of the front member or the rear member opposing the support member and that the space is created as a result of the protrusions contacting the support member.

Since the protrusions can thereby be extremely readily formed by use of press-molding operation, the space can be created at low cost and with high accuracy.

The present invention also lies in that the protrusions provided on the front member or the rear member are placed at locations on the support member overlapping locations of the first electrodes or the second electrodes.

A space between the detection electrodes and the position pointing member is filled with a resin that continually forms a protective layer (a front member), whereby amounts of relative changes in electrostatic capacitance induced by pressing action of the position pointing member can be maintained.

The present invention also lies in that the protrusions provided on the front member or the rear member are placed at locations on the support member overlapping locations where the first electrodes and the second electrodes cross each other.

A capacitive component can thereby be further curtailed without loss of a mechanical element of the reinforcing material of the rear member.

The present invention also lies in that the protrusions provided on the front member or the rear member are placed at locations on the support member overlapping locations where neither the first electrodes nor the second electrodes are provided.

The present invention also lies in that the space is formed from a sheet material encapsulating air bubbles.

The configuration makes it possible to enhance the detection accuracy of the position detector by means of a very simple configuration.

A position detector of the present invention includes in a laminated manner, a support member on which first electrodes including a plurality of electrodes arranged parallel to each other and second electrodes including a plurality of electrodes arranged parallel to each other so as to cross the first electrodes are formed; a front member that is opposed to one side of the support member and brought into contact with a predetermined position pointing member; and a rear member that is opposed to another side of the support member, wherein a high dielectric section is provided on the front member so as to run along the first electrodes and the second electrodes provided on the support member.

The configuration makes it possible to intensify changes in electrostatic capacitance simultaneously pursue a reduction in adjacent-interline capacitance.

According to the present invention, in connection with position detection utilizing a change in electrostatic capacitance, amounts of relative changes in electrostatic capacitance can be increased. Therefore, when detection electrodes become longer as a result in an increase in the size of a position detector, when a contact area of a position pointing member is small, or even in an environment involving a large level of noise, position detection can stably be performed. Therefore, there is yielded an advantage of the ability to provide a large-size position detector with high precision and high reliability.

BRIEF DESCRIPTION OF THE DRAWINGS

FIGS. 4(*a*) to 4(*c*) are cross-sectional views of a position pointing member of the position detector of the first embodiment of the present invention.

FIGS. 6(*a*) and 6(*b*) are descriptive views showing a detection signal produced by the detection circuit in the position detector of the first embodiment of the present invention.

FIGS. 8(*a*) and 8(*b*) are oblique perspective views of a principal part of the position detector of the first embodiment of the present invention.

FIGS. 13(*a*) to 13(*d*) are descriptive views of a reinforcing member in the position detector of the first embodiment of the present invention.

DETAILED DESCRIPTION

Embodiments of a position detector of the present invention are described in detail by reference to the drawings. The present invention is not limited to the embodiments described below.

(First Embodiment)

Figure 1:
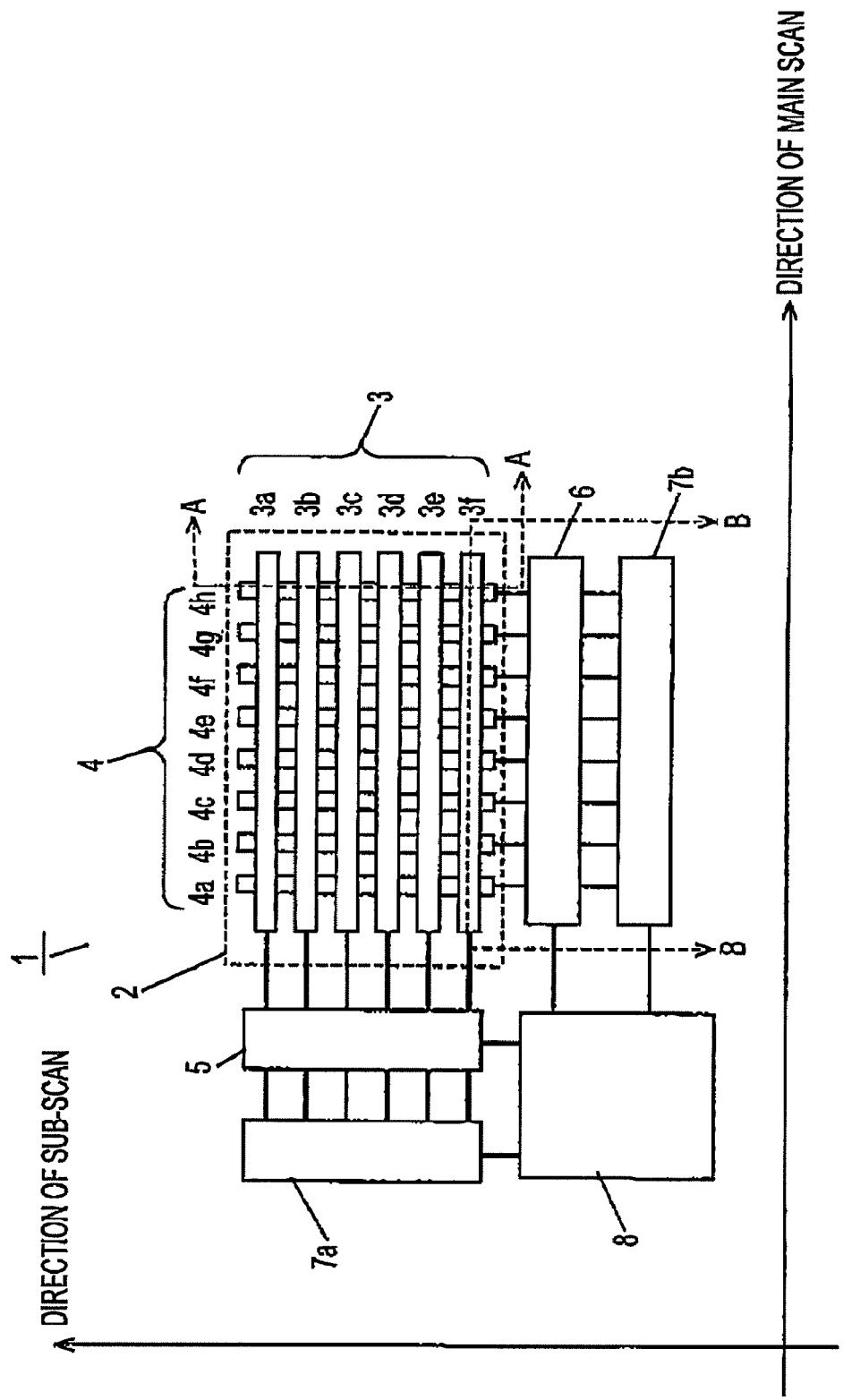
FIG. 1 is a schematic diagram of a position detector of a first embodiment of the present invention.

FIG. 1 is a schematic diagram of a position detector of a first embodiment of the present invention.

In FIG. 1, reference numeral 1 designates a position detector that is positioned on a videos screen of; for instance, a display, or built in an electronic white board (a surface of the actual position detector 1 is covered with a protective layer to be described later, and a configuration shown in FIG. 1 is not directly viewable). Reference numeral 2 designates a detection panel that accounts for the majority of the entirety of the position detector 1. A user brings a position pointing member 14 (not shown), such as a finger and a stylus pen, into contact with a surface of the detection panel 2. The user can thereby directly point a content projected or displayed on the surface of the detection panel 2 or coordinates of a position on an electronic white board, a tablet, and the like, to thus be able to input the coordinates to an information processing apparatus, such as a computer.

Figure 14:
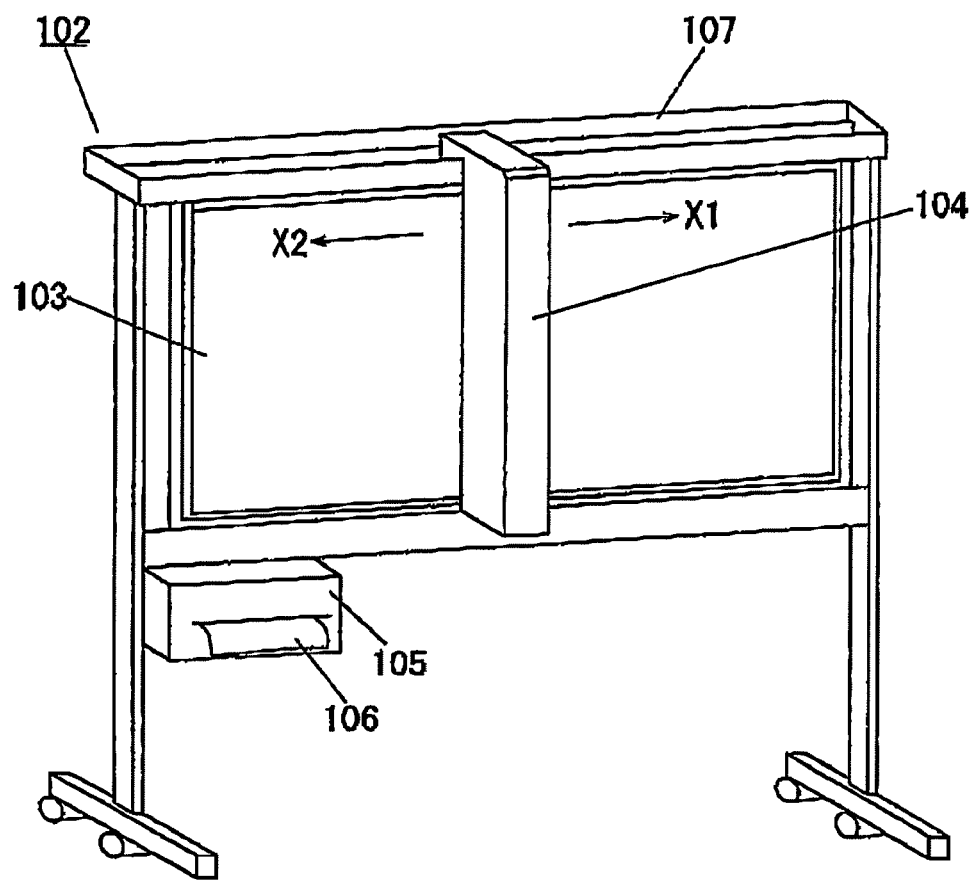
FIG. 14 is a schematic illustration showing a general overview of an electronic white board that is an application of the position detector of the first embodiment of the present invention.

FIG. 14 is a schematic illustration showing a general overview of an electronic white board that is an application of the position detector of the first embodiment of the present invention.

In FIG. 14, reference numeral 103 designates a write surface supported by a main structure 107 and doubles also as a detection surface of the detection panel 2 making up the position detector 1. The user writes information, such as texts, drawings, and the like, on the write surface (detection surface) 103 with a marker of a specific color, such as black, red, green, and blue, at a hall like a conference hall. When the electronic white board 102 is connected to an un-illustrated information processing apparatus, such as a computer, information written on the detection surface 103 of the electronic white board 102 by the user is transmitted to the information processing apparatus as coordinate information, so that the information processing apparatus can display or store the information.

Reference numeral 104 designates an optical carriage and has an un-illustrated light source and an un-illustrated image sensor. The optical carriage 104 is supported by the main structure 107 so as to be able to move in both directions X1 and X2 along the detection surface 103.

The electronic white board 102 shown in FIG. 14 is structured as follows; namely, the detection surface 103 is fastened. In the course of the optical carriage 104 moving along the detection surface 103, the detection surface 103 is exposed by means of an un-illustrated light source, and image information written on the detection surface 103 is read by means of an image sensor (not shown) provided in the optical carriage 104. The image read by the image sensor is printed on a recording sheet 106 by means of a print section 105.

Specifically, the electronic white board 102 is structured in such a way that a chart, or the like, is affixed to the detection surface 103; that an entire record of discussions conducted at the conference, or the like, can be materialized as a copy; and that data written on the detection surface 103 can be loaded directly into the information processing apparatus. As will be described later, the position detector 1 of the first embodiment makes it possible to perform a touch input with a finger and can address various input scenes.

Figure 15:
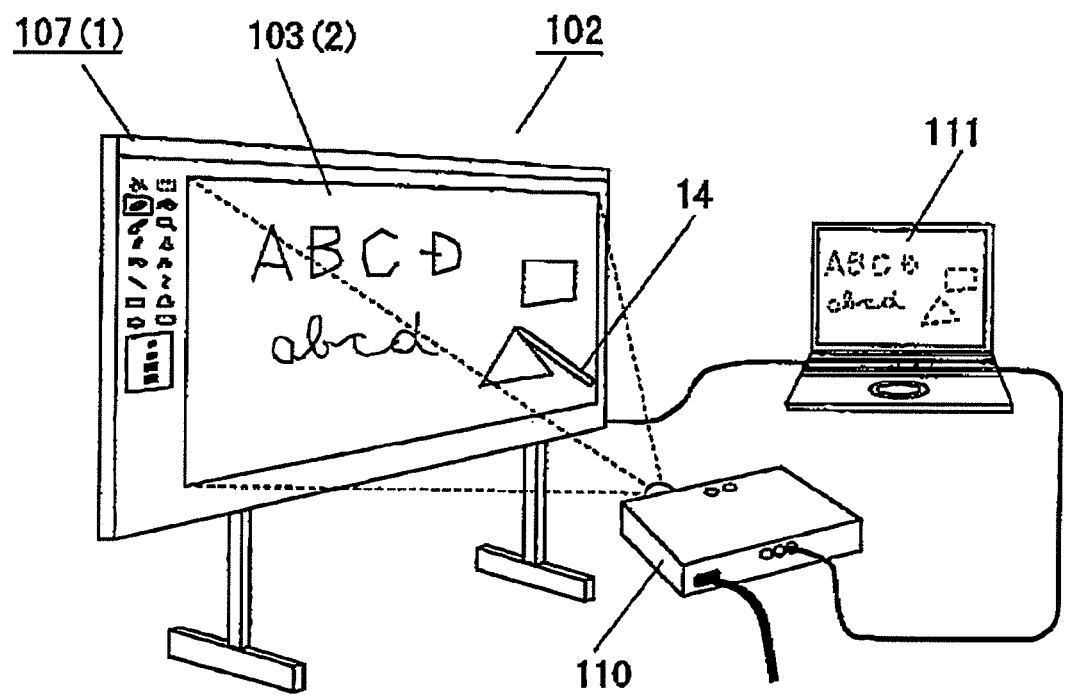
FIG. 15 is a schematic illustration showing another example white board that is an application of the position detector of the first embodiment of the present invention.

FIG. 15 is a schematic illustration showing another example electronic white board that is an application of the position detector of the first embodiment of the present invention.

The electronic white board 102 shown in FIG. 15 employs in combination the main structure 107 having the built-in position detector 1, an information processing apparatus 111, such as a computer, connected to the main structure 107, and an image projector 110 for projecting an image output from the information processing apparatus 111 on an object of projection, such as a projection screen. Such an electronic white board 102 is generally used at an educational site such as a school and a conference held in a corporation, or the like.

An explanation is given to a case where the detection panel 2 making up the electronic white board 102 is taken as an objection of projection.

When the detection panel 2 is taken as an object of projection, an optical, positional relationship between the detection surface 103 and the image projector 110, amounts of positional correction made by the information processing apparatus 111, and the like, are adjusted beforehand in such a way that coordinates detected on a front surface (the detection surface 103) of the detection panel 2 of the position detector 1 and coordinates of a projected image substantially coincide each other.

A position on the detection surface 103 is input (touched) with the position pointing member 14, such as a finger and a stylus pen, after performance of the foregoing adjustments, whereby the information processing apparatus 111 connected to the position detector 1 inputs coordinates of the position. The information processing apparatus 111 calculates coordinates corresponding to an output image from newly-input coordinates, the amounts of positional corrections, and the like, thereby updating the image; and delivers the image to the image projector 110 connected to the information processing apparatus 111. The image projector 110 projects the image on the detection surface 103.

Processing pertaining to a series of processes from input of a position (coordinates) to projection of an image is substantially, momentarily carried out. Since the input coordinates match the output coordinates, the user feels as if he/she were making a drawing directly on the detection surface 103, so long as the user moves the position pointing member 14, such as a finger and a stylus pen, over the detection surface 103.

Since it is, as mentioned above, possible to intuitively and promptly input or change an electronic image, such an electronic white board is sometimes called an interactive board or an interactive white board too.

Respective embodiments, which will be described below, can also be applied to general office machinery, such as a display and an electronic white board, as in the case of the first embodiment. The electronic white board and the interactive board are also applications of the position detector 1 and do not impose any limitations on the scope of applications of the present invention.

Turning back to FIG. 1, subsequent descriptions continue. Reference numerals 3, 3a, and 3b to 3f designate a plurality of detection electrodes (first electrodes 3) extended so as to run parallel to each other along the direction of a main scan of the detection panel 2. Reference numerals 4, 4a, and 4b to 4h designate a plurality of detection electrodes (second electrodes 4) extended so as to run parallel to each other along the direction of a sub-scan (a direction orthogonal to the direction of the main scan) of the detection panel 2.

In FIG. 1, for the sake of brevity, the first electrodes 3 are arranged in number of six, and the second electrodes 4 are arranged in number of eight. When the position detector 1 is used as input means of; for instance, an electronic white board and large-size equipment, the number of electrodes eventually increases. Specifically, an electronic white board is assumed to have a layout of 4:3 aspect ratio measuring 200 cm wide and 150 cm long, and an arrangement pitch of the detection electrodes is assumed to be 1 cm. In this case, the first electrodes 3 are arranged in number of 200, and the second electrodes 4 are arranged in number of 150.

Reference numeral 5 designates a row detection electrode selection circuit for controlling whether or not to subject the first electrodes 3 to position detection operation. Reference numeral 6 designates a column detection electrode selection circuit for controlling whether or not to subject the second electrodes 4 to position detection operation. Reference numerals 7a and 7b designate detection circuits that operate in accordance with an output from the row detection electrode selection circuit 5 or the column detection electrode selection circuit 6. The detection circuit 7a includes a predetermined oscillation circuit, and the like, and detects a change in electrostatic capacitance of the first electrodes 3. The detection circuit 7b includes a predetermined oscillation circuit, and the like, and detects a change in electrostatic capacitance of the second electrodes 4. Reference numeral 8 designates a control circuit and generate timing signals, and the like, for controlling the row detection electrode control circuit 5, the column detection electrode selection circuit 6, and the detection circuits 7a and 7b.

Processes of position detection performed by the position detector 1 of the first embodiment are described in detail.

Figure 2:
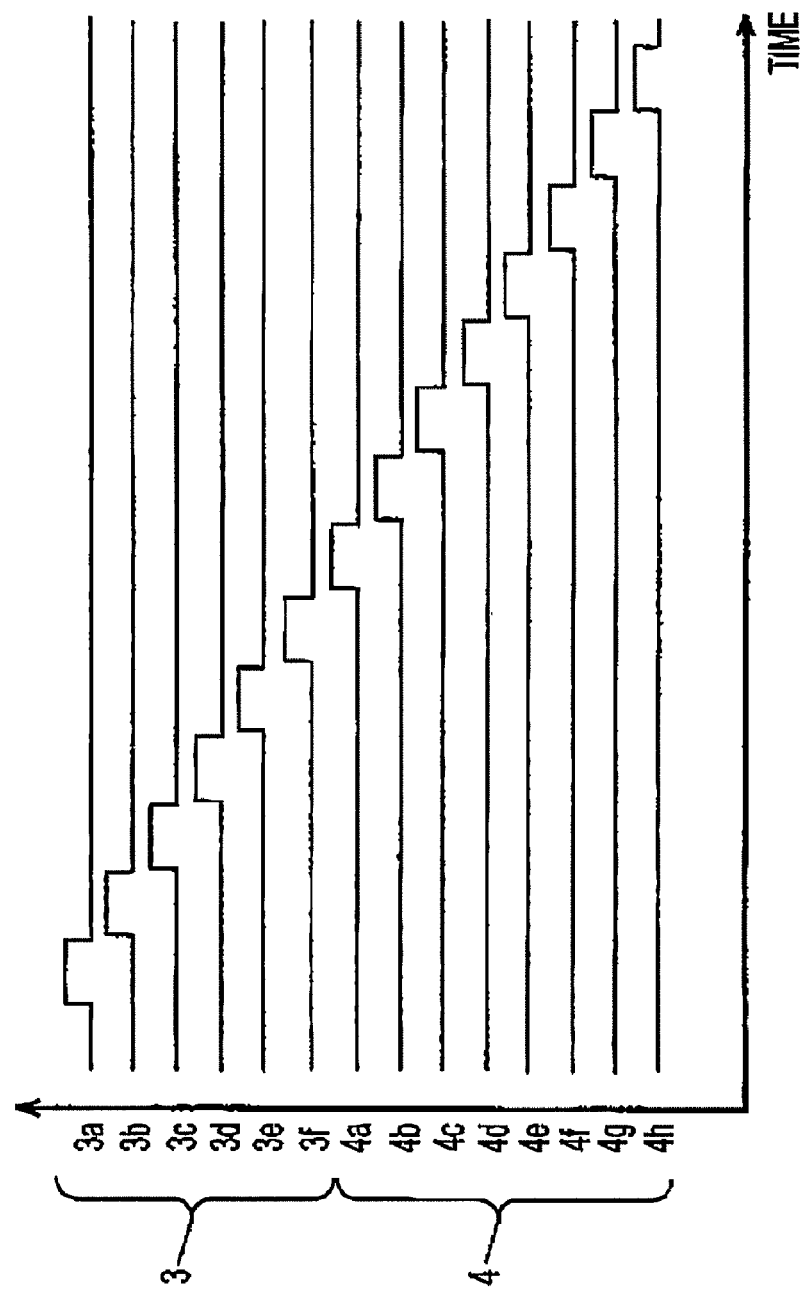
FIG. 2 is a timing chart showing operation of the position detector of the first embodiment of the present invention.

FIG. 2 is a timing chart showing operation of the position detector of the first embodiment of the present invention.

As shown in FIG. 2, the row detection electrode selection circuit 5 controlled by the control circuit 8 first sequentially selects any one from the first electrodes 3a and 3b to 3f (applies a pulse signal during a predetermined period), whereupon the first electrodes 3a and 3b to 3f are scanned. Subsequently, the column detection electrode selection circuit 6 controlled by the control circuit 8 sequentially selects any one from the second electrodes 4a and 4b to 4h (applies a pulse signal for a given period), whereupon the second electrodes 4a and 4b to 4h are scanned.

When the pulses are applied to the respective detection electrodes, the respective detection circuits 7a and 7b detect amounts of changes in electrostatic capacitance of the respective detection electrodes. A position where a cross exists between the first electrodes 3 and the second electrodes 4 is uniquely determined on the basis of the thus-detected amounts of changes.

Figure 3:
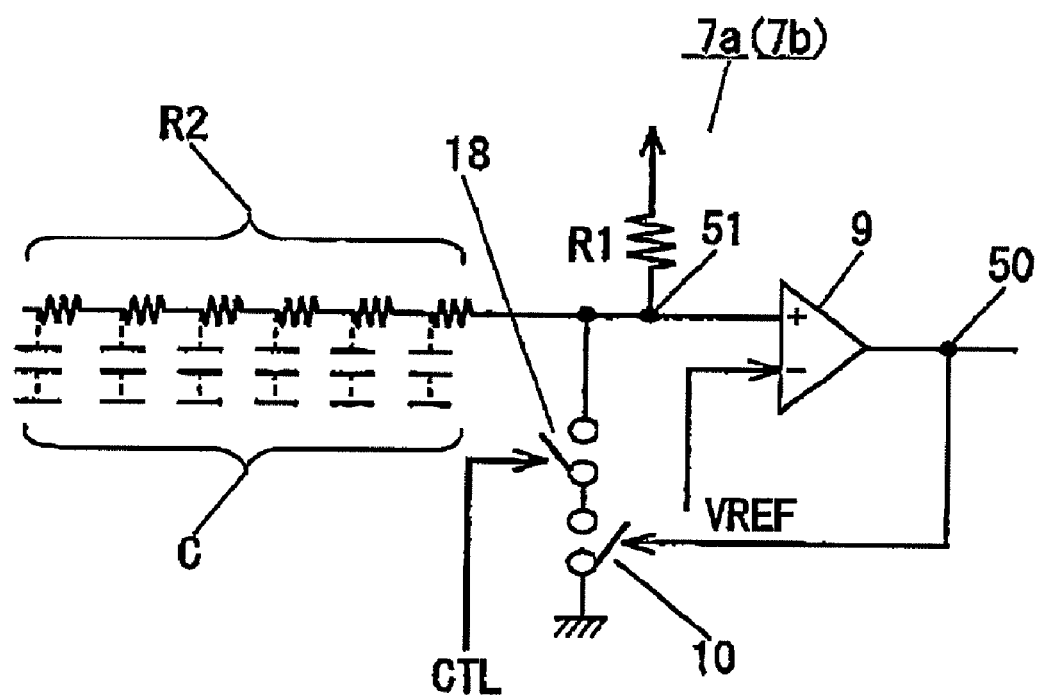
FIG. 3 is a schematic diagram of a detection circuit of the position detector of the first embodiment of the present invention.

FIG. 3 is a schematic diagram of a detection circuit of the position detector of the first embodiment of the present invention. Operation of the detection circuits 7a and 7b of the first embodiment is described in detail by referenced to FIG. 3.

As shown in FIG. 3, each of the detection circuits 7a and 7b is made up of a time constant circuit, an operation control switch 18, a voltage comparator 9, and a switch 10. The time constant circuit is determined from static capacitance C, resistance R1 determining a time constant, and combined resistance R2 of the detection electrodes. The electrostatic capacitance C further includes adjacent-interline capacitance (so-called interline capacitance) of respective detection electrodes running parallel to each other, capacitance resultant from crossing of a row detection electrode (the first electrode 3) and a column detection electrode (the second electrode 4), and stray capacitance.

The operation control switch 18 operates in response to an output from the row detection electrode selection circuit 5 (the column detection electrode selection circuit 6) shown in FIG. 1. A CTL, signal is turned ON during a "Hi" period of the timing chart shown in FIG. 2, whereupon the detection circuit 7a (7b) is controlled, to thus become active.

The switch 10 is controlled by the comparator 9. When a voltage of a node B 50 connected to an output terminal of the voltage comparator 9 is high, the switch 10 is controlled so as to be turned on. When the voltage is low, the switch 10 is controlled so as to be turned off.

Operation of the thus-configured detection circuits 7a and 7b is described in detail.

When the row detection electrode selection circuit 5 selects any one from the first electrodes 3 (the second electrodes 4) (i.e., when the selection signal shown in FIG. 2 becomes high), the operation control switch 18 is turned on, whereupon the detection circuit 7a (7b) starts operation. Subsequently, the electrostatic capacitance C is recharged through the resistor R1, whereby the voltage of a node A51 that is an input node of the voltage comparator 9 increases. When the voltage of the node A51 reaches a VREF, the voltage of the node B50 connected to the output terminal of the comparator 9 becomes high, whereupon the switch 10 is turned on.

The capacitance is thereby discharged at once, whereupon the voltage of the node A51 falls to the VREF or less. Since the output of the comparator 9 returns to a low level as a result of discharge, the switch 10 is turned off. Recharging of the electrostatic capacitance C is again initiated. The detection circuits 7a and 7b thus iterate discharging and recharging of the electrostatic capacitance C, whereby an oscillatory state is continued.

FIGS. 4(a) to 4(c) are cross-sectional views of a position pointing member of the position detector of the first embodiment of the present invention. FIG. 4(a) is a cross-sectional view showing a state in which the position pointing member 14 is held in contact with the surface of the detection panel 2. FIG. 4(a) shows a state in which the position pointing member 14 [a finger in FIG. 4(a)] remains in contact with a cross section taken along line A-A shown in FIG. 1.

In FIG. 4(a), reference numeral 11 designates a support member that supports the first electrodes 3 serving as detection electrodes on its first surface and the second electrodes 4 serving also as detection electrodes on the back side of the first surface (its second surface) while the first and second detection electrodes are spaced apart from each other. The support member 1 is a flat sheet made of a resin, such as PET, having a thickness of; for instance, 70 μm to 250 μm, and the detection electrodes are patterned on the front and back sides of the support member 11. The support member 11 exhibits a function of a flexible electrode substrate in this regard.

The first electrodes 3 and the second electrodes 4 provided on the front and back sides of the support member 1 can be formed from; for instance, ink containing silver particles, by means of a so-called printing technique, an inkjet technique, a nozzle printing technique, and the like. Moreover, a similar structure can be acquired also by means of etching a metal film provided on the surface of the support member 11.

Reference numeral 12 designates a protective layer (a surface member) that is provided on a surface of the detection panel 2; that insulates the detection electrodes (the first electrodes 3) from the outside; and that protects the detection electrodes from physical contact of a finger and others. The protective layer (the surface member) 12 is made of a phenolic resin, or the like, having a thickness of; for instance, 0.25 mm to 2 mm.

The expression "protective layer" is used not only in the first embodiment by also in respective embodiments to be subsequently described. The present invention can find application regardless of whether or not an effect of protecting the support member 11 from the outside is yielded.

Reference numeral 13 designates a reinforcing material (a rear member) that prevents deformation of the detection panel 2 and a break in the detection electrode, which would otherwise be caused by a physical contact of the position pointing member and another member. The reinforcing material (the rear member) 13 supports the support member 11 from a side (its rear surface) that is opposite to the protective layer (a front member) 12. The thickness of the overall reinforcing material (the rear member) 13 has no special limitations. An appropriate thickness can be selected according to the mode of use of a position sensor 1 or the installation environment of the same.

The expression "reinforcing material" is again used even in embodiments to be described later as well as in the first embodiment. However, the present invention can find application regardless of whether or not an effect of reinforcing the support member 11 so as not to become deformed, and the like, is yielded.

The protective layer (the front member) 12, the support member 11, and the reinforcing material (the rear member) 13 are bonded together by means of an adhesive, to thus be stacked in this sequence.

Reference numeral 14 designates a position pointing member, such as a finger and a stylus pen. When a substance other than a finger is used as the position pointing member 14, it is desirable to use; for instance, highly-flexible felt and, particularly, conductive felt, for an area of the position pointing member 14 that contacts the surface of the detection panel 2 so as to be able to assure a predetermined contact area.

The structure of the reinforcing material (the rear member) 13 is described in detail.

In the first embodiment, the reinforcing material (the rear member) 13 is a member that is formed from; for instance, a resin having a low dielectric constant, such as polypropylene and polystyrene, and that has irregularities. A height from an indentation 30 to a protuberance 31 is set to; for instance, 0.5 mm, thereby preventing deterioration of overall strength, which would be caused by presence of the indentations 30. Further, a gas layer (a space) 15 is formed from the indentations 30 between the reinforcing material (the rear member) 13 and the support member 11.

The indentations 30 [the gas layer (the space) 15 formed from the indentations] are arranged so as to be superposed on respective positions of intersections of the first electrodes 3 and the second electrodes 4 that are detection electrodes. Provided that the width of the detection electrode is L1 and that the range of the indentations 30 is L2, the indentations are of a size that fulfills a relationship L1<L2.

In the first embodiment, an electrical coupling path is interrupted by adoption of such an irregular structure, thereby making it possible to detect a change in capacitive component, which will arise when the position pointing member 14 is brought into contact with the surface of the detection panel 2, with high accuracy (which will be described later).

The reinforcing material (the rear member) 13 having such irregularities can be formed by use of; for instance, metal stamping. Although the protuberances 31 are drawn so as to stand upright with reference to the indentations 31 in FIG. 4(a), it is desirable that the protuberances will assume; for instance, a trapezoidal shape in consideration of ease of release of a pressed material from a metal mold.

FIG. 4(a) shows the cross section taken along line A-A shown in FIG. 1 as mentioned above. However, a cross section taken along line B-B shown in FIG. 1 also has a similar structure (see FIG. 8).

FIGS. 4(b) and 4(c) are other example cross sections showing that the position pointing member is brought into contact with the surface of the detection panel, as is the case with FIG. 4(a).

In FIG. 4(a), either the first electrodes 3 or the second electrodes 4 are laid on one side of the support element 11, and the remaining electrodes are laid on the other side of the support element 11, whereby the support element 11 is eventually sandwiched between the first electrodes 3 and the second electrodes 4. In FIGS. 4(b) and 4(c), the first electrodes 3 and the second electrodes 4 are laid on one side of the support element 1, and an insulation layer 19 is sandwiched between these detection electrodes. In FIG. 4(b), the first electrodes 3 and the second electrodes 4 are provided at positions proximate to the protective layer (the front member) 12. In FIG. 4(c), the detection electrodes are provided at positions proximate to the reinforcing member (the rear member) 13.

The number of surfaces to be machined during formation of the detection electrodes on the support member 11 will come to one, so long as the detection electrodes are provided on one side of the support member 11 as mentioned above. Thus, an advantage is yielded in terms of simplification of processes.

The insulation layer 19 can also be structured such that a sheet made of; for instance, PET, is sandwiched between the electrodes (either first or second detection electrodes are formed in advance on the sheet surface on this occasion). Alternatively, the support member 11 having the first electrodes 3 formed thereon can also be sprayed with an insulation material, such as a resin, to thus make the insulation layer 19, and the second electrodes 4 can also be made directly on the surface of the insulation layer 19 by means of a transfer technique, a printing technique, an inkjet technique, a nozzle printing technique, and the like.

A similar structure can also be acquired even when a metal film covering the surface of the insulation layer 19 is subjected to etching, or the like. The order of formation of the first electrodes 3 and the second electrodes 4 may also be switched. An area over which the insulation layer 19 is formed may also be limited solely to linear areas that cover only areas where single detection electrodes are formed or solely to areas where the single detection electrodes cross other detection electrodes to be formed later (in this case, the insulation layer 19 makes up an insulation section in the sense of a linear pattern or a dot pattern instead of being formed over the entirety of the detection panel 2). Material cost can be curtailed by adoption of such a structure.

Figure 5:
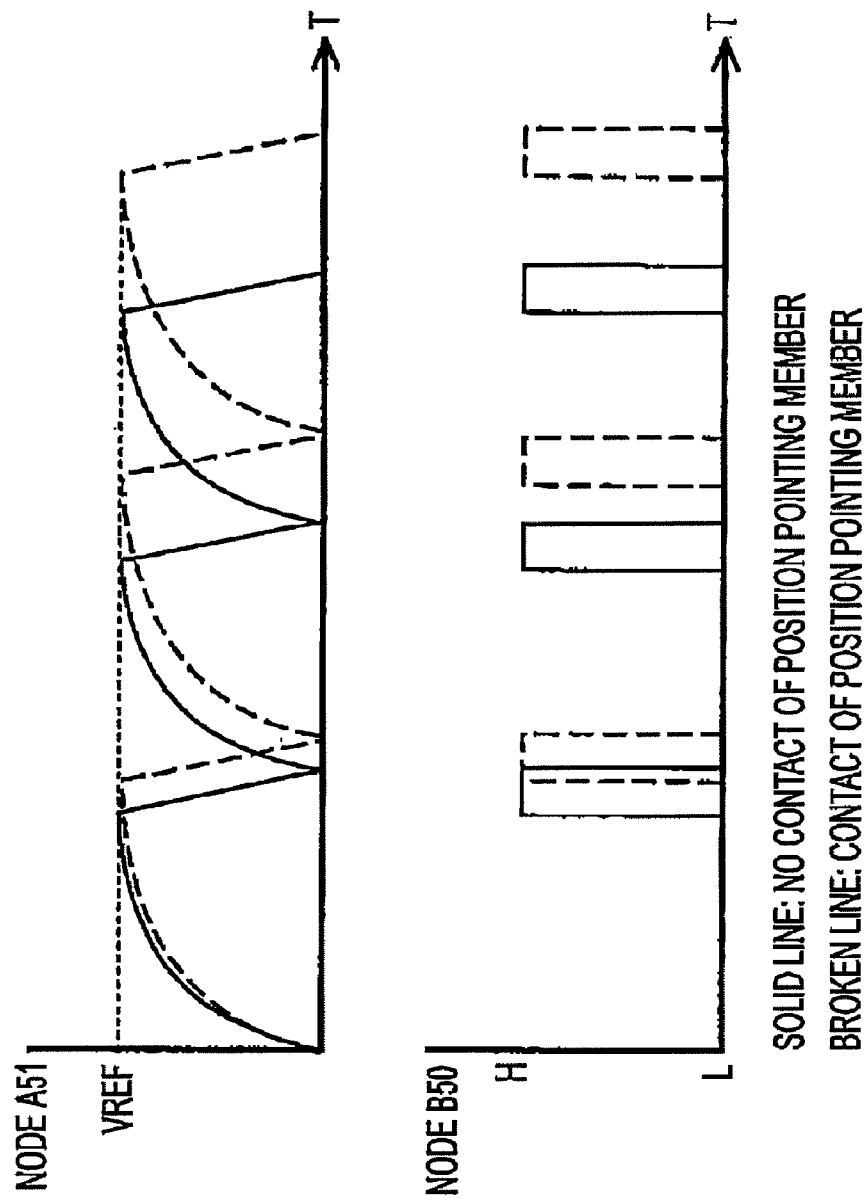
FIG. 5 is a descriptive view showing a detection signal produced by the detection circuit in the position detector of the first embodiment of the present invention.

FIGS. 5 and 6 are descriptive views representing detection signals acquired by the detection circuits in the position detector of the first embodiment of the present invention; namely, detection signals acquired by the detection circuits 7a and 7b.

By reference to FIGS. 4 through 6, there is described a change in electrostatic capacitance achieved when the position pointing member 14 is brought into contact with the protective layer (the front member) 12 of the detection panel 2.

When the position pointing member 14 contacts the protective layer (the front member) 12 of the detection panel 2, changes in electrostatic capacitance $\Delta C1$ and $\Delta C2$ as well as the foregoing electrostatic capacitance C are added to the detection electrodes arranged proximate to the contact area, as shown in FIG. 4. When the position pointing member 14 has made a contact, an increase arises in electrostatic capacitance as indicated by a broken line shown in FIG. 5 as compared with a case where the position pointing member does not make a contact. A time elapsing before the VREF is attained becomes longer, and hence a period also becomes longer. The first electrode 3 and the second electrode 4 subjected to the contact can thereby be identified.

On the occasion of actual detection of electrodes, a periodic difference resultant from absence or presence of a contact of the position pointing member 14 is considerably small in a first half portion (T1) of a previously-determined detection period (a period during which the selection signal described by reference to FIG. 2 is HIGH), as shown in FIGS. 6(a) and 6(b). Detection of the difference results in inclusion of a lot of error. For this reason, it is desirable to detect a time difference ($\Delta T$) of the $N^{th}$ period in the second half (T2) of the detection period during which the periodic difference is accumulated.

In order to detect a change in electrostatic capacitance resultant from a contact of the position pointing member with higher accuracy, the essential requirement is to increase the ratio of a change in electrostatic capacitance induced by the contact of the position pointing member 14 to the electrostatic capacitance C. The electrostatic capacitance C includes adjacent-interline capacitance (interline capacitance) of respective detection electrodes, capacitance resultant from crossing of a row detection electrode (the first electrode 3) and a column detection electrode (the second electrode), and stray capacitance.

In the large-size detection panel 2 measuring 100 inches, the respective detection electrodes are inevitably of long, and adjacent-interline capacitance becomes a component making up the largest proportion of the electrostatic capacitance C. The adjacent-interline capacitance accounts for about 50% or more of the total electrostatic capacitance C in terms of a ratio. The width of the first electrodes 3 is depicted as being large for the sake of brevity in FIGS. 4(a) to 4(c). However, the actual width of the first electrodes is narrow. For instance, the width of the first electrode is usually set to 1 mm or less as compared with an interline pitch of 10 mm. Thus, the adjacent-interline capacitance is reduced by increasing a distance between adjacent electrodes; however, the adjacent-interline capacitance becomes a dominant component as the lengths of the detection electrodes become longer as mentioned previously.

On the other hand, despite any number of areas where the row detection electrodes (the first electrodes 3) and the column detection electrodes (the second electrodes 4) formed on the respective sides of the support member 11 cross each other (overlap each other), combined capacitance is of the order of 40% of the total electrostatic capacitance C. In addition, crossing of the row detection electrodes and the column detection electrodes and other stray capacitance have little room for improvement in view of the detection technique and the structure of the detection panel 2.

Therefore, in order to increase the ratio of the change in electrostatic capacitance and the electrostatic capacitance C, either a reduction in adjacent-interline capacitance or an increase in the change of electrostatic capacitance resultant from a contact of the position pointing member 14 is effective.

Figure 7:
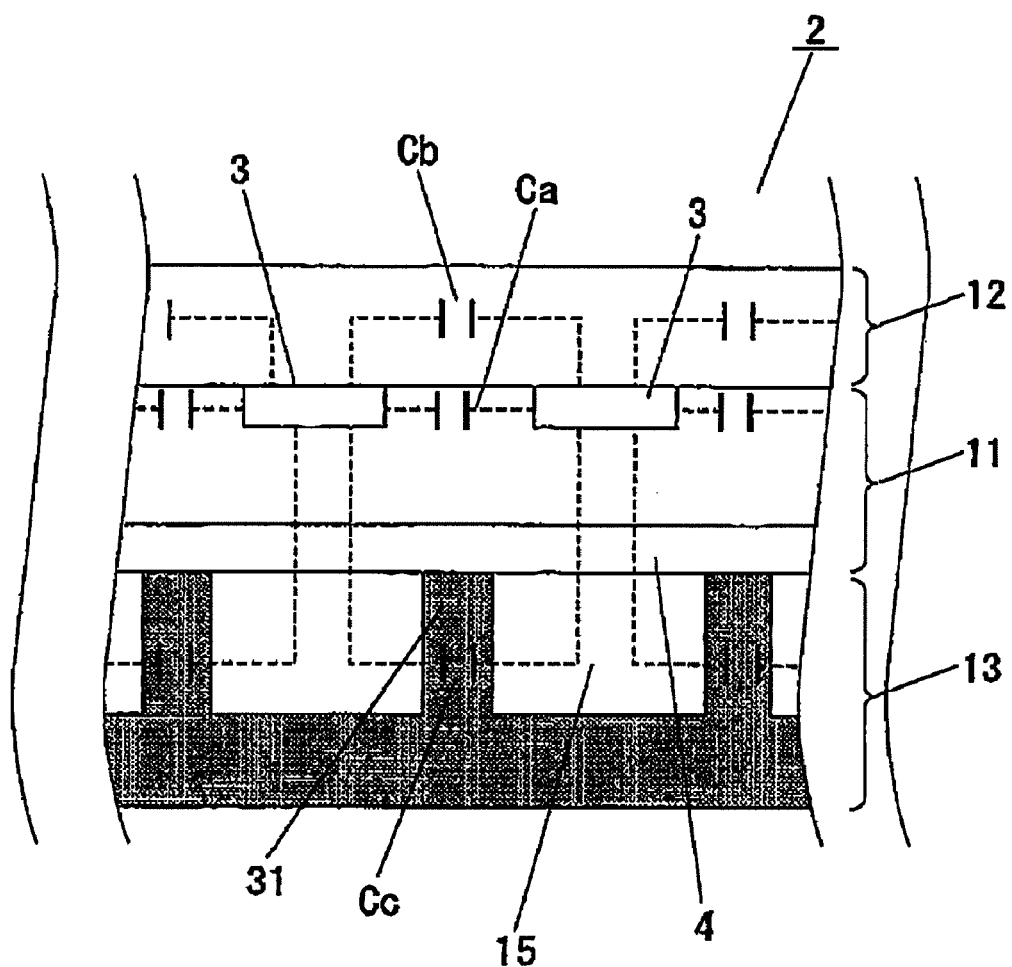
FIG. 7 is a descriptive view showing a detection signal produced by the detection circuit in the position detector of the first embodiment of the present invention.

FIG. 7 is a descriptive view that shows a detection signal acquired by the detection circuit in the position detector of the first embodiment of the present invention and that is intended for describing a factor for determination of the adjacent interline capacitance.

As shown in FIG. 7, principal components of adjacent interline capacitance include (1) a capacitive component Ca developing while the support member 11 is taken as a coupling path; (2) a capacitive component Cb developing while the protective layer (the front member) 12 is taken as a coupling path; and (3) a capacitive component Cc developing while the reinforcing material (the rear member) 13 is taken as a coupling path.

Each of these capacitive components is determined from a product of a dielectric constant of a material in a coupling path, an interelectrode distance, and an effective area of an electrode. Since the distance between electrodes and the area of the electrodes are specified by the size of a detection target and a technique for producing the detection panel 2, placing a member having a small dielectric constant in the coupling path is effective for diminishing adjacent-interline capacitance.

In FIG. 7, when the support member 11 made of; for instance, a PET resin, is changed to a support member made of glass, the capacitive component Ca is increased by 1.2 to 3.3 times when compared with a PET resin is used for the support member, because the dielectric constant of the PET resin is about three times as large as the dielectric constant of a vacuum and because the dielectric constant of glass is about 3.7 to 10 times as large as the dielectric constant of the vacuum.

Conversely, when a material having a low dielectric constant is used, the capacitive component is decreased. Therefore, the capacitive component can be reduced correspondingly, so long as only a portion of the coupling path is changed rather than the material of the entire coupling path being replaced with a material having a low dielectric constant.

A dielectric constant of a gas is usually low and is only 1.005 times as large as that of a vacuum that is a member having the minimum dielectric constant (a dielectric constant of $8.854 \times 10^{-12}$ F/m). Thus, the gas is not much different from the vacuum in terms of a dielectric constant. Even in view of cost, stability, and the like, air (or carbon dioxide as will be described later) is easiest to use.

In the first embodiment, irregularities are made on the reinforcing material (the rear member) 13, to thus introduce a gas layer (a space) 15, whereby realization of (3); namely, a reduction in capacitive component Cc developing while the reinforcing material (the rear member) 13 is taken as a coupling path, is made feasible.

What is achieved by expressing the first embodiment in the form of a configuration is a position detector. The position detector has the support member 11 with the first electrodes 3 including a plurality of electrodes arranged parallel to each other and the second electrodes 4 including a plurality of electrodes that are arranged parallel to each other so as to cross the first electrodes 3. The position detector additionally has, in the form of a multilayer, the protective layer (the front member) 12 that is opposed to one side of the support member 11 and with which a predetermined position pointing member is brought into contact; and the reinforcing material (the rear member) 13 is opposed to the other side of the support member 11. The gas layer (space) 15 is provided at positions corresponding to (overlapping) middle points between the reinforcing material (the rear member) 13 and the first electrodes 3 or the second electrodes 4.

As will be described later in connection with subsequent embodiments, the gas layer (space) 15 can also be provided on the support element 11 or the protective layer (the front member) 12 or can also be provided at two or more regions among the support member 11, the protective layer (the front member) 12, and the reinforcing material (the rear member) 13. The gas layer (space) 15 can also be separated into respective pieces or materialized in the form of a continual layer as described in connection with the embodiment.

FIGS. 8(a) and 8(b) are oblique, schematic perspective views of a principal section of the position detector of the first embodiment of the present invention.

In FIG. 8(a), an irregular structure is formed in the reinforcing material (the rear member) 13 as has been described. As a result of the projections 31 being provided in the reinforcing material, a gas layer (space) 15 is made between the support member 11 and the reinforcing material (the rear member) 13. Specifically, the projections 31 are provided on the face of the reinforcing material (the rear member) 13 opposing the support member 11, and the gas layer (space) 15 is formed as a result of the projections 31 contacting the support member 11.

Of the coupling path interconnecting the first electrodes 3 and the coupling path interconnecting the second electrodes 4, coupling paths formed within the reinforcing material (the rear member) 13 are provided with an introduction of air, so that a capacitive component is significantly reduced. The configuration makes it possible to increase a relative amount of change in electrostatic capacitance and achieve enhanced accuracy of position detection even in the large-size position detector 1. The gas layer (space) 15 can also be readily obtained even by means of subjecting the reinforcing material (the rear member) 13 to stamping as well as to metal pressing.

In the meantime, according to such a configuration of the first embodiment, the projections 31 are evenly provided on the reinforcing material (the rear member) 13. Hence, even when the air layer (space) 15 is provided, the fundamental function of the reinforcing material (the rear member) 13; namely, prevention of deformation of the detection panel, which would otherwise be caused by a physical contact of a finger, a stylus, and another member, can be implemented. A function for preventing occurrence of a break in the electrodes, is not practically impaired.

Positions at which the reinforcing material (the rear member) 13 contacts the support member 11 [i.e., positions where the reinforcing material (the rear member) 13 supports the support member 11] are provided so as to avoid occurrence of crossovers at positions where the row detection electrodes (the first electrodes 3) and the column detection electrodes (the second electrodes 4) are formed with the support member 11 sandwiched therebetween; namely, at positions on the support member 11 overlapping positions where neither the first electrodes nor the second electrodes are laid.

There is prevented occurrence of a change in the distance between the row detection electrodes and the distance between the column detection electrodes, which would otherwise be caused when the support member 11 is deformed by pressing force generated when the position pointing member 14 contacts the protective layer (the front member) 12 of the detection panel 2. Fluctuations in electrostatic capacitance component C, which would otherwise be caused by the magnitude of pressing force exerted when the position pointing member 14 has made a contact, can be prevented.

The first embodiment can be implemented without being subjected to restrictions imposed by materials of the first electrodes 3, the second electrodes 4, the support member 11, the protective layer (the front member) 12, manufacturing techniques therefor, and the like.

FIGS. 13(a) to 13(d) are descriptive views of the reinforcing material in the position detector of the first embodiment of the present invention, explaining a layout of the projections 31 provided on the reinforcing material (the rear member) 13, or the like. FIG. 13(a) is equivalent of a plane perspective view of the principal part shown in FIG. 8(a) when viewed from above.

In the first embodiment, as shown in FIGS. 13(a), the projections 31 are arranged so as not to cross (contact) any of the first electrodes 3 and the second electrodes 4. For instance, as shown in FIG. 13(b), the projections 31 can also be provided between and parallel to the first electrodes 3. Such an arrangement makes it possible to strengthen supporting of the support member 11 provided by the reinforcing material (the rear member) 13.

FIG. 13(c) shows a cross-sectional view taken along line F-F shown in FIG. 13(b).

When the projections 31 are arranged in a manner shown in FIG. 13(b), the projections straddle the second electrodes 4. For this reason, it is preferable that notches 33 will be made in areas where the projections 31 would straddle the second electrodes 4 as shown in FIG. 13(c), to thus disconnect the coupling path. The notches 33 are provided at positions where the reinforcing material (the rear member) 13 contacts the support member 11; namely, in an upper surface of the reinforcing material (the rear member) 13. Therefore, the notches 33 can be made by one operation through press working performed during formation of the projections 31.

In lieu of the layout shown in FIG. 13(b), the projections 31 can also be provided between and parallel to the second electrodes 4.

As shown in FIG. 13(d), some of the projections 31 can be arranged parallel to the first electrodes 3, and the other projections 31 can also be arranged parallel to the second electrodes 4. The longitudinal directions of the respective projections 31 are combined with two directions, thereby making it possible to further enhance the support strength of the reinforcing material (the rear member) 13 while pursuing the foregoing reduction in electrostatic capacitance. Even in this case, it is desirable to make the notches 33 in the areas where the projections straddle the first electrodes 3 or the second electrodes 4 as shown in FIG. 13(c).

FIG. 8(b) shows an example modification of the principal section of the position detector shown in FIGS. 8(a) to 8(d).

In FIG. 8(b), reference numeral 35 designates a reinforcing material formed from a sheet material containing air bubbles. An example material available as the reinforcing material 35 is made by mixing a resin typified by expanded polystyrene with air bubbles and molding the mixture. So long as the reinforcing material 35 is configured by means of such a member, it becomes possible to introduce a gas into coupling paths formed in the reinforcing material 35, among the coupling path interconnecting the first electrodes 3 and the coupling path interconnecting the second electrodes 4, as in the case of the structure shown in FIG. 8(a), and hence a capacitive component can be reduced. The configuration makes it possible to increase the amounts of relative changes in electrostatic capacitance, and enhanced accuracy of position detection can be achieved even in a large-size position detector.

In the configuration, the reinforcing material 35 is bonded to, while remaining in plane contact with, the entirety of the support member 11. Therefore, the reinforcing material 35 becomes advantageous in terms of the ability to assure the original function of reinforcing the support member 11. Moreover, it is more preferable to mix the reinforcing material 35 with hollow beads whose exteriors are made of a rigid material, because both a reduction in dielectric constant and the original function of the reinforcing material can be pursued to a high degree.

(Second Embodiment)

Figure 9:
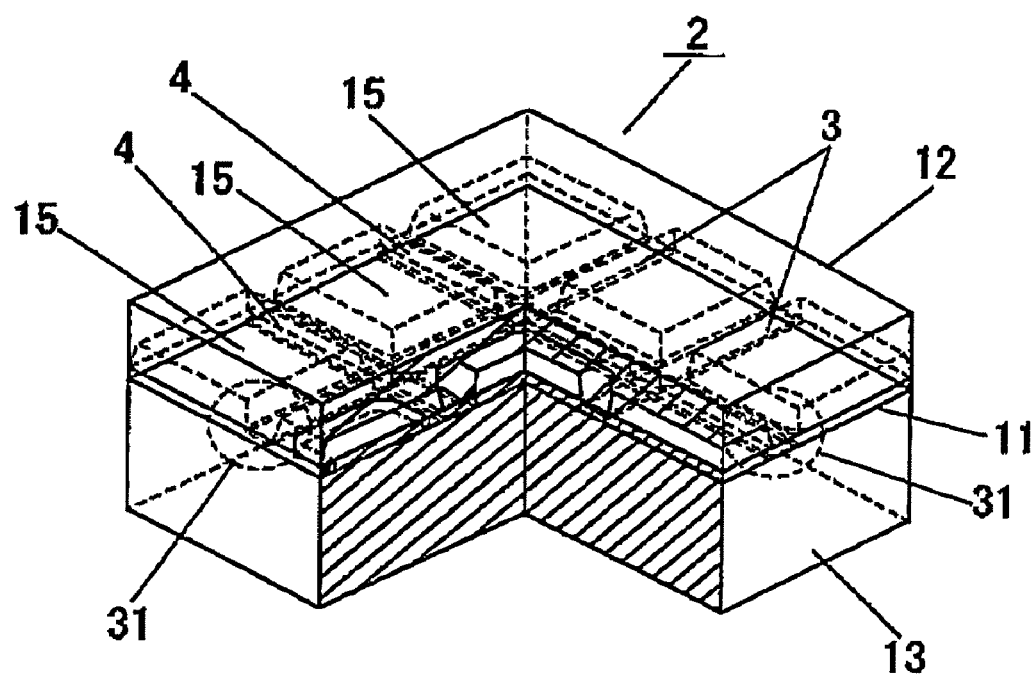
FIG. 9 is an oblique perspective view of a principal part showing the configuration of a position detector of a second embodiment of the present invention.

FIG. 9 is an oblique perspective view of a principal part showing the configuration of a position detector of a second embodiment of the present invention.

In the second embodiment, the gas layer (space) 15 is interposed between the support member 11 and the protective layer (the front member) 12. Since the layout of the detection electrodes, the structure of the support member 11, electrical operation, and the like, of the present embodiment are the same as their respective counterparts described in connection with the first embodiment, their explanations are omitted.

As shown in FIG. 9, the position detector 1 of the second embodiment has indentations that are provided, in the detection panel 2, on a support-member-side surface of the protective layer (the front member) 12 which the position pointing member 14 (not shown) contacts. The gas layer (space) 15 is consequently provided between the protective layer and the support member 11.

The protuberances 31 are provided on the surface of the protective layer (the front member) 12 opposing the support member 11, and the gas layer (space) 15 that are indentations are formed as a result of the protuberances 31 contact the support member 11. The protuberances 31 are placed at positions where the support member 11 overlaps (crosses over) locations of the first electrodes 3 or the second electrodes 4.

By means of the configuration, a gas is inserted into a coupling path in the protective layer (the front member) 12, among the coupling path interconnecting the first electrodes 3 and the coupling path interconnecting the second electrodes 4, so that a capacitive component (Cb shown in FIG. 7), which will occur, can be curtailed.

The configuration can readily be implemented by forming irregularities in the surface of the protective layer (the front member) 12 opposing the support member 11 during machining or metal-working operation, by boring predetermined positions on the protective layer (the front member) and bonding a sheet element on the surface of the thus-bored layer, and others.

By means of the configuration, it is possible to increase amounts of relative changes in electrostatic capacitance, and enhanced accuracy of position detection can be achieved even in a large-size position detector 1. The projections 31 are also let coincide with (cross over) the positions where the row detection electrodes (the first electrodes 3) and the column detection electrodes (the second electrodes 4) are arranged. Hence, a space between the detection electrodes and the position pointing member 14 is consecutively filled with a resin, or the like, that makes up the protective layer (the front member) 12, so that amounts of relative changes in electrostatic capacitance caused by pressing action of the position pointing member 14 do not decrease.

A substantially-equal advantage is yielded without making irregularities in the protective layer (the front member) 12 by means of machining or the like, so long as the projections 31 and corresponding areas of the gas layer (space) 15 are replaced with a member that is produced by mixing a resin typified by expanded polystyrene with air bubbles and molding the mixture.

The second embodiment can be practiced simultaneously with the first embodiment.

(Third Embodiment)

Figure 10:
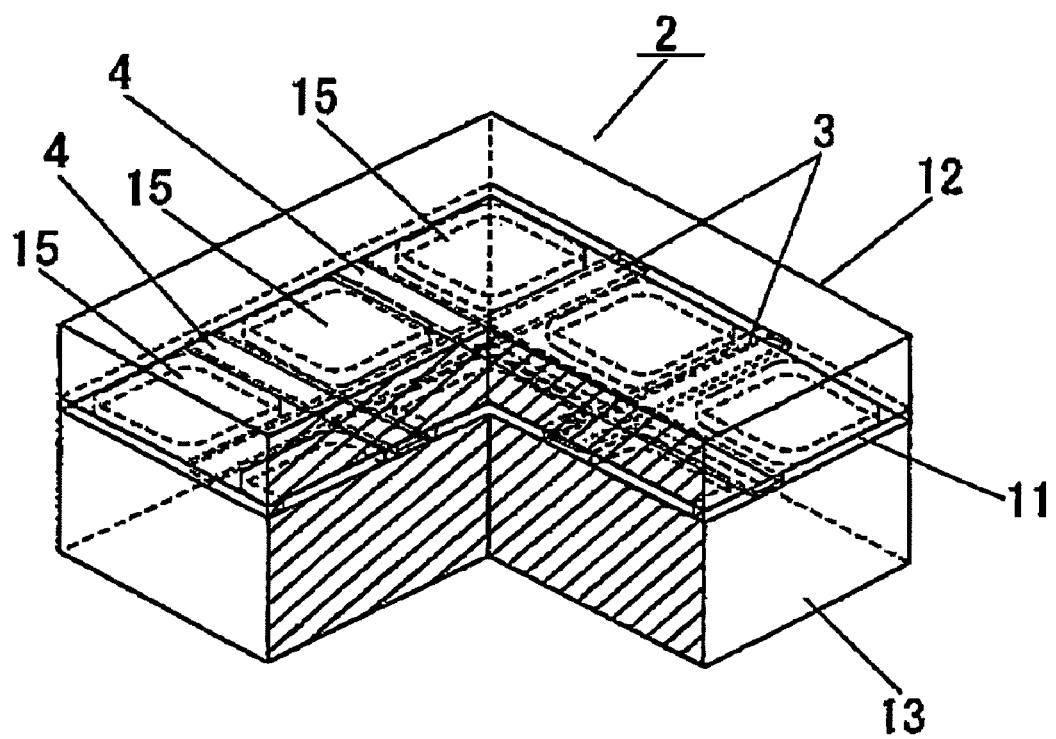
FIG. 10 is an oblique perspective view of a principal part showing the configuration of a position detector of a third embodiment of the present invention.

FIG. 10 is an oblique perspective view of a principal part showing the configuration of a position detector of a third embodiment of the present invention.

In the third embodiment, the gas layer (space) 15 is provided in the support element 11. Since the layout of the detection electrodes, the structure of the protective layer (the front member) 12, electrical operation, and the like, of the present embodiment are the same as their respective counterparts described in connection with the first embodiment, their explanations are omitted.

As shown in FIG. 10, the position detector 1 of the third embodiment has the gas layer (space) 15 provided in the support member 11 having the first electrodes 3 and the second electrodes 4 arranged thereon in the detection panel 2.

Specifically, in the third embodiment, the support member 11 is configured in such a way that a remaining area except an area of the support member where the first electrodes 3 and the second electrodes 4 are arranged is eliminated. By means of the configuration, a gas is inserted into a coupling path in the support member 11, among the coupling path interconnecting the first electrodes 3 and the coupling path interconnecting the second electrodes 4, so that a capacitive component (Ca shown in FIG. 7), which will occur, can be diminished.

The configuration is particularly effective for a case where the first electrodes 3 and the second electrodes 4 are made on the support element 11 formed from a PET resin, or the like, by use of ink predominantly containing a silver carbon mixture, or the like, and by means of screen printing. The configuration can readily be implemented by boring areas between the detection electrodes on the support member 11 after printing.

It is also possible to make detection electrodes only at required positions by application of the screen printing technique, the inkjet technique, the nozzle printing technique, and the like, to the support member 11 formed in; for instance, a meshed pattern (or formed by boring a sheet member).

The support member 11 is formed from a material containing air bubbles, such as expanded polystyrene. A substantially-same effect is yielded by forming detection electrodes over the entirety of the support member 11 (without performance of processing, such as boring).

The third embodiment can be practiced simultaneously with the second embodiment.
(Fourth Embodiment)

Figure 11:
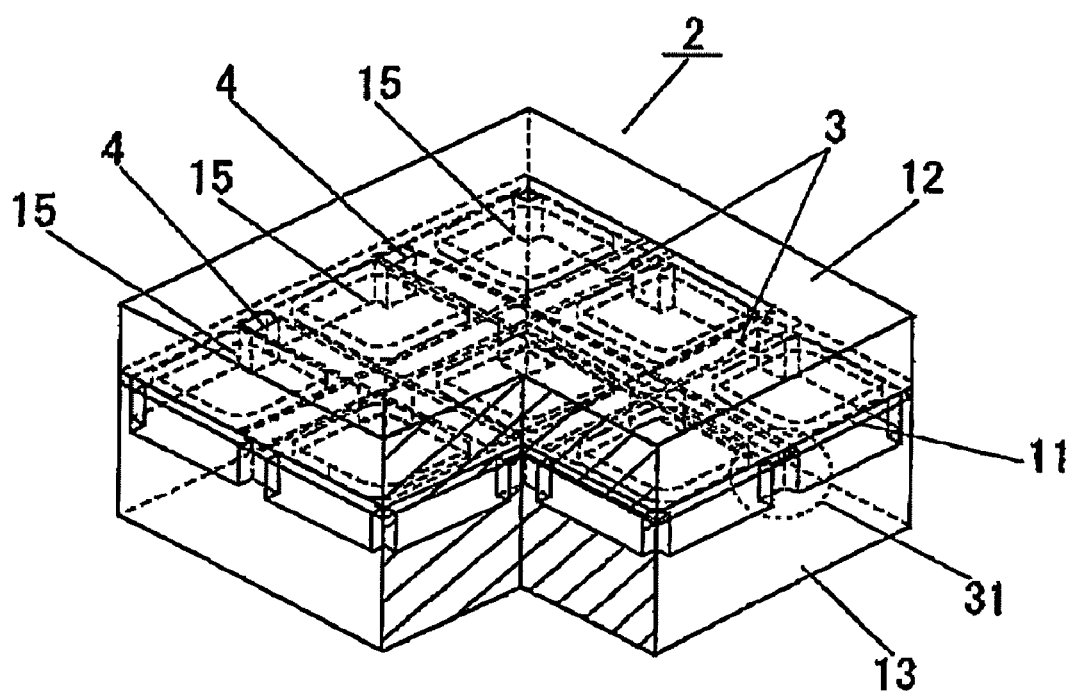
FIG. 11 is an oblique perspective view of a principal part showing the configuration of a position detector of a fourth embodiment of the present invention.

FIG. 11 is an oblique perspective view of a principal part showing the configuration of a position detector of a fourth embodiment of the present invention.

In the fourth embodiment, the gas layer (space) 15 is provided on the support member 11 and the reinforcing material (the rear member) 13. Since the layout of the detection electrodes, the structure of the protective layer (the front member) 12, electrical operation, and the like, of the present embodiment are the same as their respective counterparts described in connection with the first embodiment, their explanations are omitted.

As shown in FIG. 11, the gas layer (space) 15 is provided in both the support member 11 and the reinforcing member (the rear member) 13. A gas is thereby introduced into the coupling paths formed respectively in the support member 11 and the reinforcing material (the rear member) 13, among the coupling path interconnecting the first electrodes 3 and the coupling path interconnecting the second electrodes 4. Capacitive components (Ca and Cc shown in FIG. 7), that will be induced, are therefore reduced.

When compared with the configuration described in connection with the first embodiment, the configuration is materialized in such a way that the protuberances 31 of the reinforcing material (the rear member) 13 are sandwiched between the reinforcing material 13 and the support member 11 so as to match (overlap or cross over) the intersections of the row detection electrodes (the first electrodes 3) and the column detection electrodes (the second electrodes 4). The capacitive component can further be curtailed without loss of a mechanical element of the reinforcing material (the rear member) 13 even when the configuration of the support member 11 is made identical with that described in connection with the third embodiment.

By means of the configuration, it is possible to increase amounts of relative changes in electrostatic capacitance, and enhanced accuracy of position detection can be achieved even in a large-size position detector. The fourth embodiment can be practiced simultaneously with the second embodiment.
(Fifth Embodiment)

Figure 12:
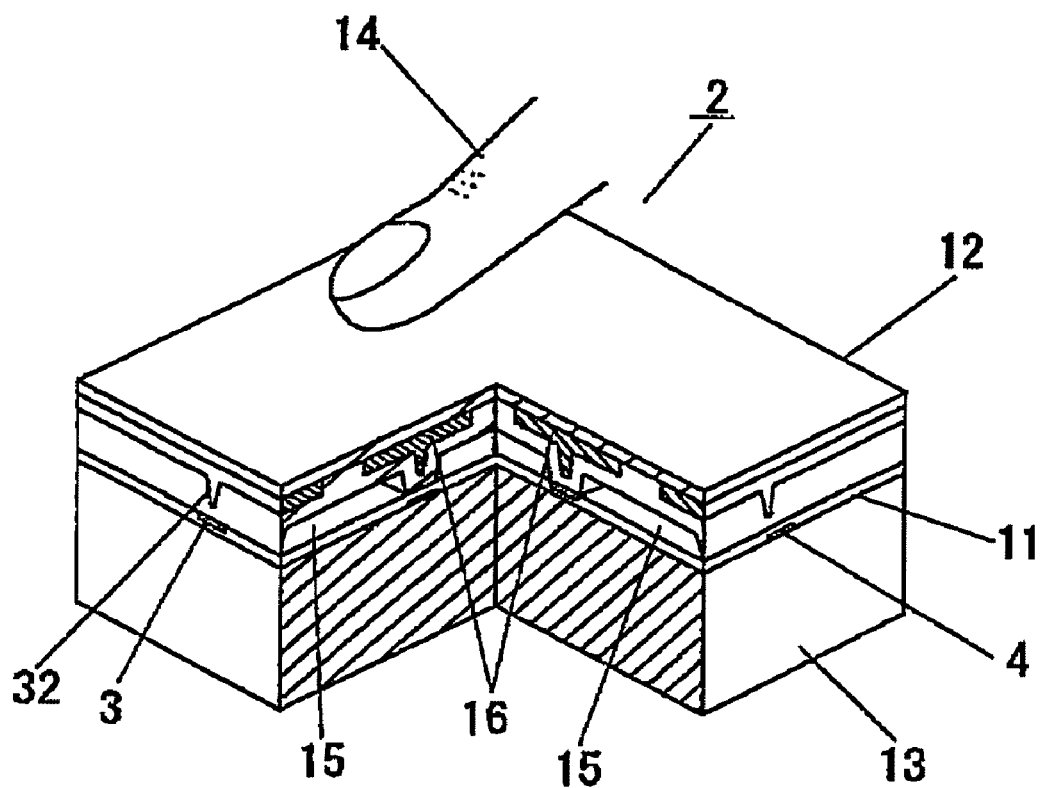
FIG. 12 is an oblique perspective view of a principal part showing the configuration of a position detector of a fifth embodiment of the present invention.

FIG. 12 is an oblique perspective view of a principal part showing the configuration of a position detector of a fifth embodiment of the present invention.

In the fifth embodiment, a space is provided on the protective layer (the front member) 12, thereby creating the gas layer (space) 15 between the support member 11 and the protective layer (the front member) 12. By means of the configuration, a gas is inserted into a coupling path formed between the support member 11 and the protective layer (the front member) 12, among the coupling path interconnecting the first electrodes 3 and the coupling path interconnecting the second electrodes 4, so that a capacitive component (Cb shown in FIG. 7), which will occur, can be reduced.

In the fifth embodiment, a high dielectric section 16, which is obtained by encapsulating; for instance, water, an aqueous solution, or a gelatinous substance containing water or an aqueous solution, is provided in the protective layer (the front member) 12. As illustrated, the high dielectric section 16 has protrusions 32 provided on the protective layer (the front member) 12, and the protrusions 32 are provided so as to extend along the first electrodes 3 and the second electrodes 4. The protrusion 32 consequently assumes a substantially-cruciform at an intersection where the first electrode 3 and the second electrode 4 cross each other with the support member 11 interposed therebetween.

Water has a dielectric constant that is about 80 times as large as that of a gas. The configuration therefore makes it possible to insert a member exhibiting a higher dielectric constant into the coupling path between the position pointing member 14 and the first electrode 13 and the coupling path between the position pointing member 14 and the second electrode 4. When compared with the case where the protective layer (the front member) 12 is made of only a resin, electrostatic coupling developing between the detection electrodes and the position pointing member 14 becomes further intensified.

It is therefore possible to intensify a change in electrostatic capacitance resulting from the position pointing member 14 contacting the protective layer (the front member) 12 making up the detection panel 2 and simultaneously pursue a further reduction in adjacent-interline capacitance. The configuration makes it possible to increase amounts of relative changes in electrostatic capacitance, and enhanced accuracy of position detection can be achieved even in the large-size position detector 1.

In order to realize the configuration for providing the high dielectric section 16, the high dielectric section can also be formed by means of encapsulating not only liquid, such as water, but high dielectric substance of powder dispersed in liquid, or by means of outsert-molding a brim of a pre-formed high dielectric member from a resin.

The fifth embodiment can be practiced simultaneously with the first, third, or fourth embodiment.

In the foregoing embodiments, a reduction in steadily-existing electrostatic capacitance has been pursued as a challenge. Incidentally, the embodiments also encounter a secondary effect; namely, pursuit of weight reduction, in connection with provision of the gas layer (space) 15 in any of the protective layer (the front member) 12, the support member 11, and the reinforcing material (the rear member) 13 or in a plurality of members. Each of blocks of the gas layer (space) 15 arranged in a continually-extended pattern or a cell-like pattern has a small volume; however, when the detection panel 2 comes to have a large area, significant weight reduction is accomplished.

Further, in the foregoing embodiments, the detection panel 2 is finally built as a result of the protective layer (the front member) 12, the support member 11, and the reinforcing material (the rear member) 13 being bonded together. Air bubbles or an excessive adhesive is extruded into the gas layer (space) 15 when the respective members are bonded together in a bonding process, so long as the gas layer (space) 15 is provided between the detection electrodes (e.g., the first electrodes 3) as mentioned previously. Uniform bonding of the respective sections is therefore improved. Detection accuracy is thereby enhanced further.

In order to make the advantages more effective, it is preferable to form the previously-described protrusions 31 (32) so as to assume the shape of a truncated pyramid having a smaller area for application of an adhesive or a trapezoidal shape whose cross section becomes smaller at least at a contact portion of the protrusion, from the viewpoint of extrusion of air bubbles, or the like.

In the first through fifth embodiments, pressurized carbon dioxide is sealed in the gas layer (space) 15 provided in the respective embodiments. The position detector has, as mentioned previously, the structure such that the protective layer (the front member) 12, the support member 11, and the reinforcing material (the rear member) 13 are, in this sequence, bonded together by means of an adhesive and hermetically sealed from the outside. The gas layer (space) 15 formed in the detection panel 2 is continually extended particularly in the first and fourth embodiments, so that a large quantity of gas can be reserved.

The position detector 1 of each of the embodiments is means for providing a so-called user interface and builds; for instance, an electronic white board, a display device, and the like, in combination with another piece of hardware. A subject assuring a user interface is the detection panel 2 included in the position detector 1. Therefore, the detection panel 2 is often placed at a comparatively elevated position so as to make the user easy to watch, and other units, such as a power unit, are usually accommodated in a lower portion of the position detector in many cases.

If a heat source, such as a power unit, generates heat for any reasons in such a structure, to thus start a fire, and if the detection panel 2 has caught the fire, a large quantity of carbon dioxide will be released into the lower portion of the detector from the inside as a result of rupture of the detection panel 2, thereby making it possible to prevent the spread of the fire.

According to the position detector of the present invention, it is possible to build a position detector exhibiting a superior detection-tracking characteristic and superior noise resistance. Therefore, the present invention can be applied to an electronic white board, a position detector for use with a projector, and various position detectors of display units. In particular, when the position detector is provided with a large area, the present invention is extremely useful.

This application claims the benefit of Japanese Patent application No. 2009-105990 filed on Apr. 24, 2009, the entire contents of which are incorporated herein by reference.

What is claimed is:

1. A position detector, comprising in a laminated manner:
 a support member on which first electrodes including a plurality of electrodes arranged in parallel to each other and second electrodes including a plurality of electrodes arranged in parallel to each other so as to cross the first electrodes are formed;
 a front member that is opposed to one side of the support member and brought into contact with a predetermined position pointing member; and
 a rear member that is opposed to another side of the support member;
 wherein a gas layer is provided between the support member and the rear member.

2. The position detector according to claim 1,
 wherein protrusions are provided on a surface of the front member or the rear member opposing the support member; and
 the gas layer is created as a result of the protrusions contacting the support member.

3. The positions detector according to claim 2,
 wherein the protrusions provided on the front member or the rear member are placed at locations on the support member overlapping locations of the first electrodes or the second electrodes.

4. The position detector according to claim 2,
 wherein the protrusions provided on the front member or the rear member are placed at locations on the support member overlapping locations where the first electrodes and the second electrodes cross each other.

5. The position detector accordingly to claim 2,
 wherein the protrusions provided on the front member or the rear member are placed at locations on the support member overlapping locations where neither the first electrodes nor the second electrodes are provided.

6. The position detector according to claim 1,
 wherein an area of the support member except areas where the first electrodes and the second electrodes are provided is eliminated.

7. The position detector according to claim 1,
 wherein the gas layer is formed from a sheet material encapsulating air bubbles.

8. A position detector, comprising in a laminated manner:
 a support member on which first electrodes including a plurality of electrodes arranged in parallel to each other and second electrodes including a plurality of electrodes arranged in parallel to each other so as to cross the first electrodes are formed;
 a front member that is opposed to one side of the support member and brought into contact with a predetermined position pointing member; and
 a rear member that is opposed to another side of the support member;
 wherein a high dielectric section is provided in the front member so as to run along the first electrodes and the second electrodes provided on the support member, and a gas layer is provided between the support member and the front layer.

* * * * *